(12) United States Patent
Shrivastava et al.

(10) Patent No.: US 11,436,040 B2
(45) Date of Patent: Sep. 6, 2022

(54) SYSTEM AND METHODS FOR HIERARCHICAL INLINE INTERRUPT SCHEME FOR EFFICIENT INTERRUPT PROPAGATION AND HANDLING

(71) Applicant: Marvell Asia Pte Ltd, Singapore (SG)

(72) Inventors: Saurabh Shrivastava, Saratoga, CA (US); Guy T. Hutchison, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 76 days.

(21) Appl. No.: 16/947,448

(22) Filed: Jul. 31, 2020

(65) Prior Publication Data

US 2021/0318903 A1 Oct. 14, 2021

Related U.S. Application Data

(60) Provisional application No. 63/008,511, filed on Apr. 10, 2020.

(51) Int. Cl.
*G06F 9/48* (2006.01)
*G06F 9/54* (2006.01)
*G06F 11/07* (2006.01)
*G06F 9/30* (2018.01)
*G06F 9/38* (2018.01)

(52) U.S. Cl.
CPC ........ *G06F 9/4812* (2013.01); *G06F 9/30101* (2013.01); *G06F 9/30145* (2013.01); *G06F 9/3877* (2013.01); *G06F 9/542* (2013.01); *G06F 11/0772* (2013.01)

(58) Field of Classification Search
CPC .............. G06F 9/4812; G06F 9/30101; G06F 9/30145; G06F 9/3877; G06F 9/542; G06F 11/0772; G06F 13/24; G06F 9/3012; G06F 9/327
See application file for complete search history.

(56) References Cited

U.S. PATENT DOCUMENTS 5,530,891 A * 6/1996 Gephardt ................ G06F 13/26
710/260
6,397,325 B1 * 5/2002 Jones .................... G06F 13/385
710/39

(Continued)

*Primary Examiner* — Farley Abad

(57) ABSTRACT

A new approach of systems and methods to support a hierarchical interrupt propagation scheme for efficient interrupt propagation and handling is proposed. The hierarchical interrupt propagation scheme organizes a plurality of slave interrupt handlers associated functional blocks in a chip in a hierarchy. When an exception or error condition occurs in a functional block, a slave interrupt handler associated with the functional block creates an interrupt packet as an interrupt notification and utilizes pre-existing input and output interfaces that have already been utilized for accessing registers of the functional block to transmit the created interrupt packet to a central interrupt handler through the hierarchy without running dedicated interconnect wires out of the functional block. The central interrupt handler then processes the interrupt notifications and provides a response packet to the interrupt notification back to slave interrupt handler that created the interrupt packet to configure or adjust the functional block accordingly.

25 Claims, 4 Drawing Sheets

(56) References Cited

U.S. PATENT DOCUMENTS

| | | | |
|---|---|---|---|
| 6,539,448 B1* | 3/2003 | Deng | G06F 13/26 |
| | | | 710/263 |
| 2003/0196130 A1* | 10/2003 | Pastorello | G06F 13/4291 |
| | | | 713/400 |
| 2005/0228918 A1* | 10/2005 | Kriegel | G06F 13/24 |
| | | | 710/260 |
| 2016/0048470 A1* | 2/2016 | Zhang | G06F 9/4812 |
| | | | 710/110 |
| 2020/0089632 A1* | 3/2020 | Graif | G06F 13/26 |

* cited by examiner

SYSTEM AND METHODS FOR HIERARCHICAL INLINE INTERRUPT SCHEME FOR EFFICIENT INTERRUPT PROPAGATION AND HANDLING

CROSS-REFERENCE TO RELATED APPLICATIONS

This application claims the benefit of U.S. Provisional Patent Application No. 63/008,511, filed Apr. 10, 2020, which is incorporated herein in its entirety by reference.

BACKGROUND

As hardware-based application-specific integrated circuits (ASICs) are becoming larger in size and more complex in architectures and functionalities, the number of functional blocks (or simply blocks) in each of these ASIC chips are growing rapidly as well. For example, it is very typical for the ASIC chips to have a functional block count running into hundreds or even thousands. During operation, each of the functional blocks in a chip generates one or more interrupt notifications when encountering various exceptions and error conditions. Currently, the interrupt notifications are sent out of each functional block to a central interrupt controller in the chip where the interrupt notifications are combined and encoded. Only then the interrupt notifications are sent out of the chip to a host or an interrupt handler, which will execute an interrupt process routine to process the interrupt notifications. Such interrupt handling mechanism requires all functional blocks in the chip to run multiple interconnect wires (depending on interrupt priorities supported) from the functional blocks to the central interrupt controller. When the number of functional blocks in the chip is large, too many interconnect wires may converge on the central interrupt controller. As a result, chip designers would have to put in big efforts in frontend resistor-transistor level (RTL) development to implement the wiring connectivity of these interconnect wires, which may be error-prone and may require significant front-end verification efforts by the chip designers. In addition, too many interconnect wires may cause congestion issues in the backend flow of layout of the chip and it may take significant backend time and effort to meet timing requirements on the top-level interconnect wires running long traces across the chip.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
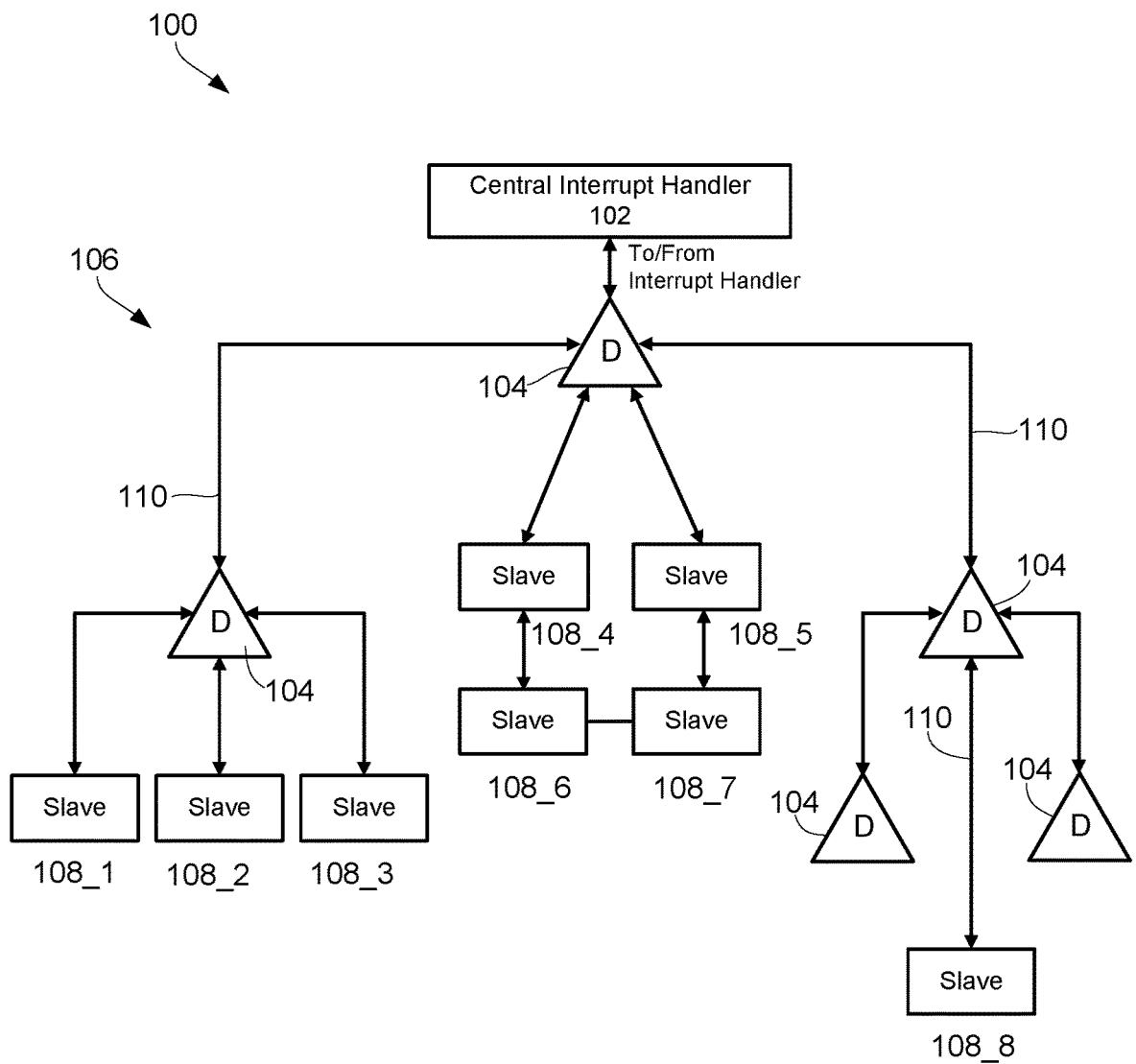
FIG. 1 depicts an example of a diagram of a hardware-based hierarchical interrupt propagation scheme for efficient interrupt propagation and handling according to an aspect of a present embodiment.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts and the terminology is not intended to be limiting. Unless defined otherwise, all technical and scientific terms used herein have the same meaning as commonly understood in the art to which the embodiments pertain.

A new approach of systems and methods to support a hierarchical interrupt propagation scheme for efficient interrupt propagation and handling is proposed. The hierarchical interrupt propagation scheme organizes a plurality of slave interrupt handlers associated with a plurality of functional blocks in a chip in a hierarchical structure or hierarchy. When an exception or error condition occurs in one of the functional blocks, a slave interrupt handler associated with the functional block creates an interrupt packet as an interrupt notification and utilizes pre-existing input and output interfaces and/or interconnect wires that have already been used for accessing registers of the functional block to transmit the created interrupt packet to a central interrupt handler through the hierarchy without running additional interconnect wires dedicated for the interrupt notifications out of each functional block. The central interrupt handler then processes the interrupt notifications received from the slave interrupt handler and provides a response packet to the interrupt notification back to the slave interrupt handler that created the interrupt packet to configure or adjust the functional block accordingly.

By reutilizing the pre-existing register access interfaces and/or interconnect wires out of the functional blocks in the chip, the hierarchical interrupt propagation scheme proposed above eliminates the need for thousands of interrupt-based interconnect wires going from the functional blocks to the central interrupt handler. Such hierarchical interrupt propagation scheme results in a significant reduction in time and effort required in front-end design, verification, and back-end implementation of the chip having a large number of functional blocks. In the meantime, with proper design of the hierarchy of the functional blocks in the chip, latency due to the propagation delay of the interrupt notifications through the hierarchy can be kept within a certain constraint.

FIG. 1 depicts an example of a diagram of a hardware-based hierarchical interrupt propagation scheme for efficient interrupt propagation and handling. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, wherein the multiple hosts can be connected by one or more networks.

In the example of FIG. 1, an architecture 100 includes at least a central/master interrupt handler 102, a plurality of address decoders 104s (represented by "D" in FIG. 1) arranged in a multi-level hierarchy 106, e.g., a tree-like structure, and a plurality of slave interrupt handlers 108s (e.g., 108_1 to 108_8) each attached to one of the plurality of address decoders 104s, wherein each slave interrupt handler 108 is a register module associated with or inside a type of functional block (not shown) in a chip. The architecture 100 further includes a plurality of bi-directional linkages/interconnects 110s that connect various components of the architecture 100 together to form the architecture 100. Each of these components in the architecture 100 is a dedicated hardware block/component programmable by a user at a host (not shown) via software instructions for various operations. When the software instructions are executed, each of the hardware components becomes a special purposed hardware component for practicing certain machine learning functions. In some embodiments, the architecture 100 is on a single chip, e.g., a system-on-chip (SOC).

Figure 2:
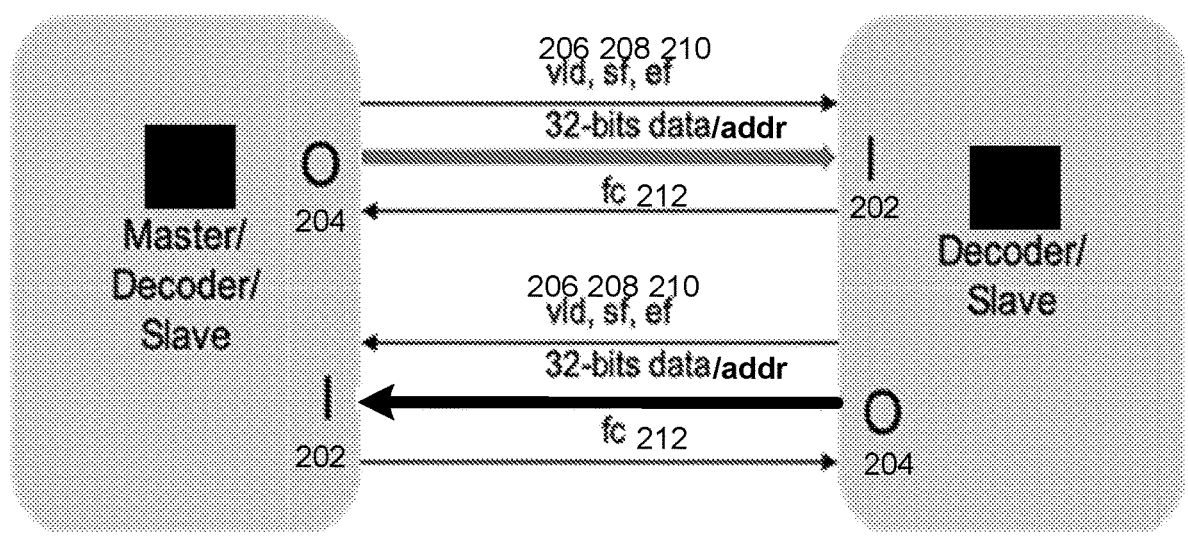
FIG. 2 depicts examples of at least an input interface and an output interface associated with each of the central interrupt handler, the plurality of address decoders, and the plurality of slave interrupt handlers according to an aspect of a present embodiment.

In the example of FIG. 1, each of the central interrupt handler 102, the plurality of address decoders 104s, and the plurality of slave interrupt handlers 108s includes at least an input interface 202 and an output interface 204 as shown by the example of FIG. 2. In some embodiments, each of the input interface 202 and the output interface 204 is configurable and/or programmable by the user. In some embodiments, each input interface 202 is configured to accept data, address, and control information/signals, e.g., valid signal qualifier from the sending interface (vld) 206, state-of-frame (sf) 208, and end-of-frame (ef) 210, into the interrupt handlers 102 and 108s and/or the address decoders 104s, and send out a flow control signal (e.g., fc 212) from the interrupt handlers 102 and 108s and/or the address decoders 104s back to the interface that sends the vld signal. Each output interface 204 is configured to send/transmit data, address, and control information/signals (e.g., vld 206, sf 208, and ef 210) from the interrupt handlers 102 and 108s and/or the address decoders 104s, and accept the flow control signal (e.g., fc 212) into the interrupt handlers 102 and 108s and/or the address decoders 104s. In some embodiments, the input interfaces 202s and the output interfaces 204s pre-existing on each of the central interrupt handler 102, the address decoders 104s, and the slave interrupt handlers 108s function as register access interfaces configured to access the registers (not shown) in these components to write data and/or control information into or read data and/or control information from certain addresses of the registers in these components, respectively.

In the example of FIG. 1, each slave interrupt handler 108 is a register module configured to implement a set of register functionalities associated with its functional block (not shown) in the chip. Here, the functional block associated with each of the slave interrupt handlers 108_1 to 108_8 can be but is not limited to one of a PCIe block for interfacing communication between an external host and the chip, an Ethernet memory block for handling and storing Ethernet communications with the chip, a bus block for transmitting address, data, and control information over a bus in the chip, and a local block for handling communications among various functional blocks in the chip.

In some embodiments, each slave interrupt handler 108 is configured to generate an interrupt transaction/notification and handle relevant operations for the interrupt notification, wherein such interrupt notification is triggered when an exception or error condition occurs in one of the functional blocks associated with the slave interrupt handler 108. In some embodiments, the slave interrupt handler 108 is configured to generate the interrupt notification upon an interrupt bit in a special interrupt register (not shown) of the slave interrupt handler 108 is set by the functional block. The slave interrupt handler 108 is then configured to send the interrupt notification in the form of an interrupt packet to the central interrupt handler 102 via a pre-existing register read interface (e.g., output interface 204) configured to transmit the interrupt packet out of the slave interrupt handler 108. The following is a non-limiting example of a description of various fields in a 32-bit interrupt packet. As show by the example below, the interrupt packet includes the interrupt bit (IntSet) discussed above; a one-bit Priority field indicating the priority of the interrupt notification (e.g., high or low), which can be easily extended to a multi-bit priority by using more than one bit from the reserved field; a Block Type field (e.g., 16 bits) that uniquely identifies one of, e.g., up to 64k, different types of functional blocks in the chip from which the interrupt notification is generated; and a Block Instance field (e.g., 8 bits) that uniquely identifies one of up to 256 instances of the type of functional blocks from which the interrupt notification is generated.

| Bits | Definition |
| --- | --- |
| 31:16 | Block Type |
| 15:8 | Block Instance |
| 7:4 | Reserved |
| 3 | Priority (High = 1, Low = 0) |
| 2 | IntSet (Set = 1, Clear = 0) |
| 1:0 | CmdType = 3 |

Once the interrupt packet is generated and sent out by one of the slave interrupt handlers 108s via its pre-existing register read/output interface 204, the interrupt packet is transmitted up to the central interrupt handler 102 through one or more layers of address decoders 104s in the multi-level hierarchy 106. As shown in FIG. 1, each address decoder 104 serves as an intermediate node in the multi-level hierarchy 106 and is associated with one or more slave interrupt handlers 108s and/or one or more other address decoders 104s. In some embodiments, each address decoder 104 is configured to accept the interrupt packet from the associated one or more slave interrupt handlers 108s and/or other address decoders 104s, decode a destination address of the interrupt packet, and forward the interrupt packet to the central interrupt handler 102 or the next address decoder 108 in the multi-level hierarchy 106 based on the decoded destination address. The central interrupt handler 102 is then configured to accept and process the interrupt packet. Conversely, once the central interrupt handler 102 finishes processing the interrupt packet and generates a response packet to the received the interrupt packet, the address decoders 108s are configured to accept the response packet from the central interrupt handler 102, decode the destination address of the response packet, and forward the response packet to the slave interrupt handler 108, which sends the corresponding interrupt packet, or the next address decoder 108 in the multi-level hierarchy 106. Once the slave interrupt handler 108 accepts the response packet, the functional block associated with the slave interrupt handler 108 may then be configured or adjusted according to the response packet received.

Figure 3:
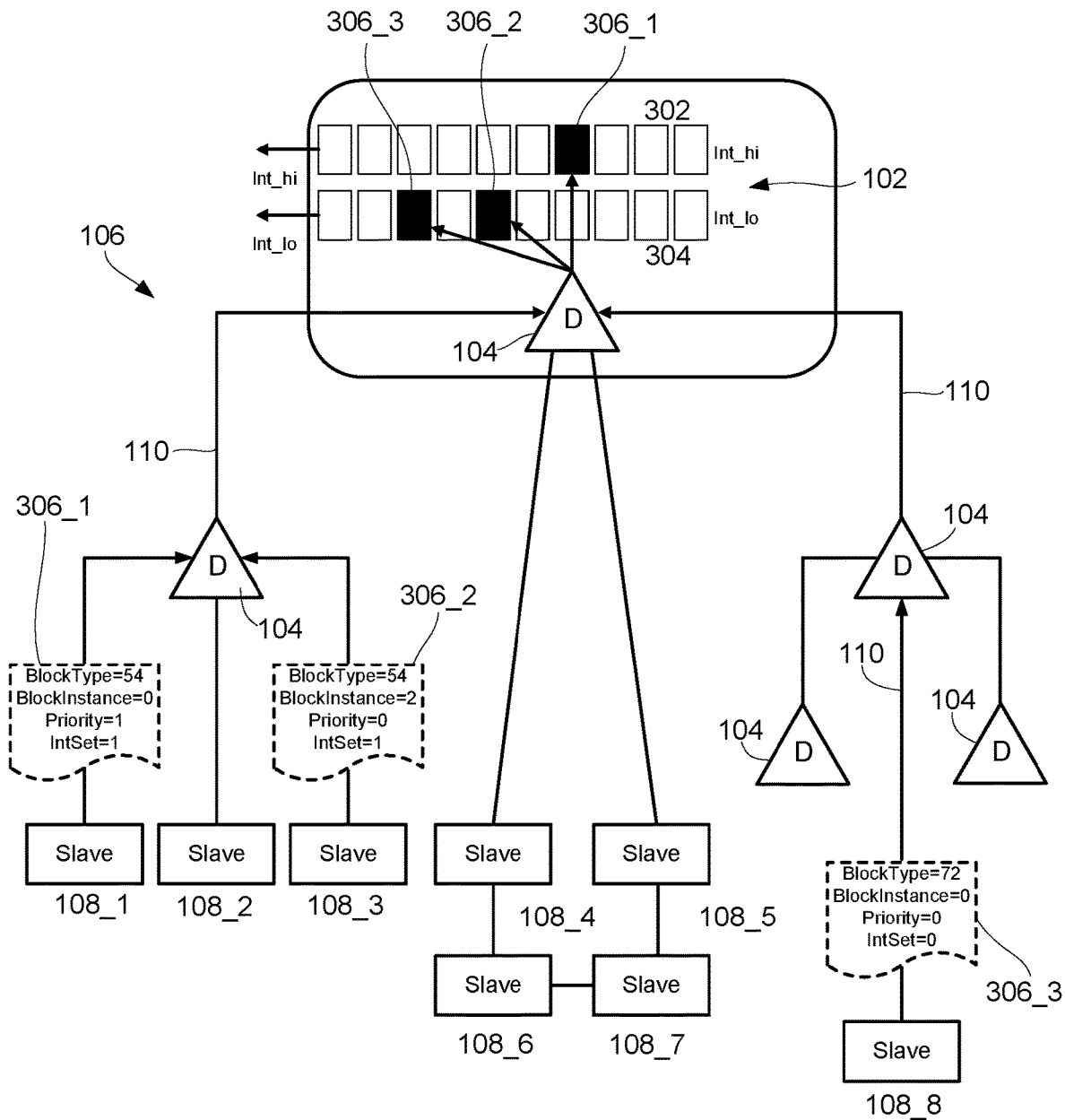
FIG. 3 depicts an example of a diagram of a hardware-based hierarchical interrupt propagation scheme wherein the central interrupt handler implements two interrupt registers corresponding to the two different interrupt priorities according to an aspect of a present embodiment.

In the example of FIG. 1, the central interrupt handler 102 is configured to accept and decode various fields of the interrupt packet once the interrupt packet reaches the central interrupt handler 102. In some embodiments, the central interrupt handler 102 includes two interrupt registers corresponding to the two different (high and low) interrupt priorities—interrupt high register (int_high) 302 and interrupt low register (int_low) 304 as shown by the example of FIG. 3. In some embodiment, more interrupt registers can be included in the central interrupt handler 102 in case of more than two interrupt priorities. In some embodiments, the interrupt registers 302 and 304 each has as many bits (width) as the number of functional blocks in the chip. In some embodiments, the interrupt registers 302 and 304 are utilized by the central interrupt handler 102 to combine interrupt notifications/packets received from the functional blocks across the chip for processing. Specifically, in some embodiments, the central interrupt handler 102 is configured to determine and select which one of the interrupt high register 302 or the interrupt low register 304 to be accessed and set for an interrupt notification based on the "Priority" field of the interrupt packet received. In some embodiments, the central interrupt handler 102 is configured to utilize the combined {Block Type, Block Instance} fields for indexing the received interrupt notification to select the corresponding interrupt bit in the interrupt register selected based on the Priority field. Once the interrupt bit in one of the interrupt registers is selected, the central interrupt handler 102 is configured to set or clear the value of the interrupt bit based on "IntSet" value. As shown by the non-limiting examples in FIG. 3, interrupt notification 306_1 generated by the slave interrupt handler associated with Se0 is of high priority. The bit corresponding to {Block Type=54, Block Instance=0} is then set to 1 in the interrupt high register 302. Interrupt notification 306_2 generated by the slave interrupt handler associated with Se2 is of low priority. The bit corresponding to {Block Type=54, Block Instance=2} is then set to 1 in the interrupt low register 304. Interrupt notification 306_3 generated by the slave interrupt handler associated with URW is also of low priority and the bit corresponding to {Block Type=54, Block Instance=2} is cleared to 0 in the interrupt low register 304 based on IntSet=0 in interrupt notification 306_3. The central interrupt handler 102 is then configured to execute an interrupt process routine to process the interrupt notifications/packets received in the interrupt registers based on their priorities or the order they are received in the interrupt registers to create a plurality of response packets corresponding to the interrupt packets. The central interrupt handler 102 is then configured to send the generated response packet back to the slave interrupt handlers 108s that generated the interrupt notifications for configuration or adjustment to the functional blocks associated with the slave interrupt handlers 108s via the plurality of address decoders 104s in the hierarchy 106 as discussed above.

Figure 4:
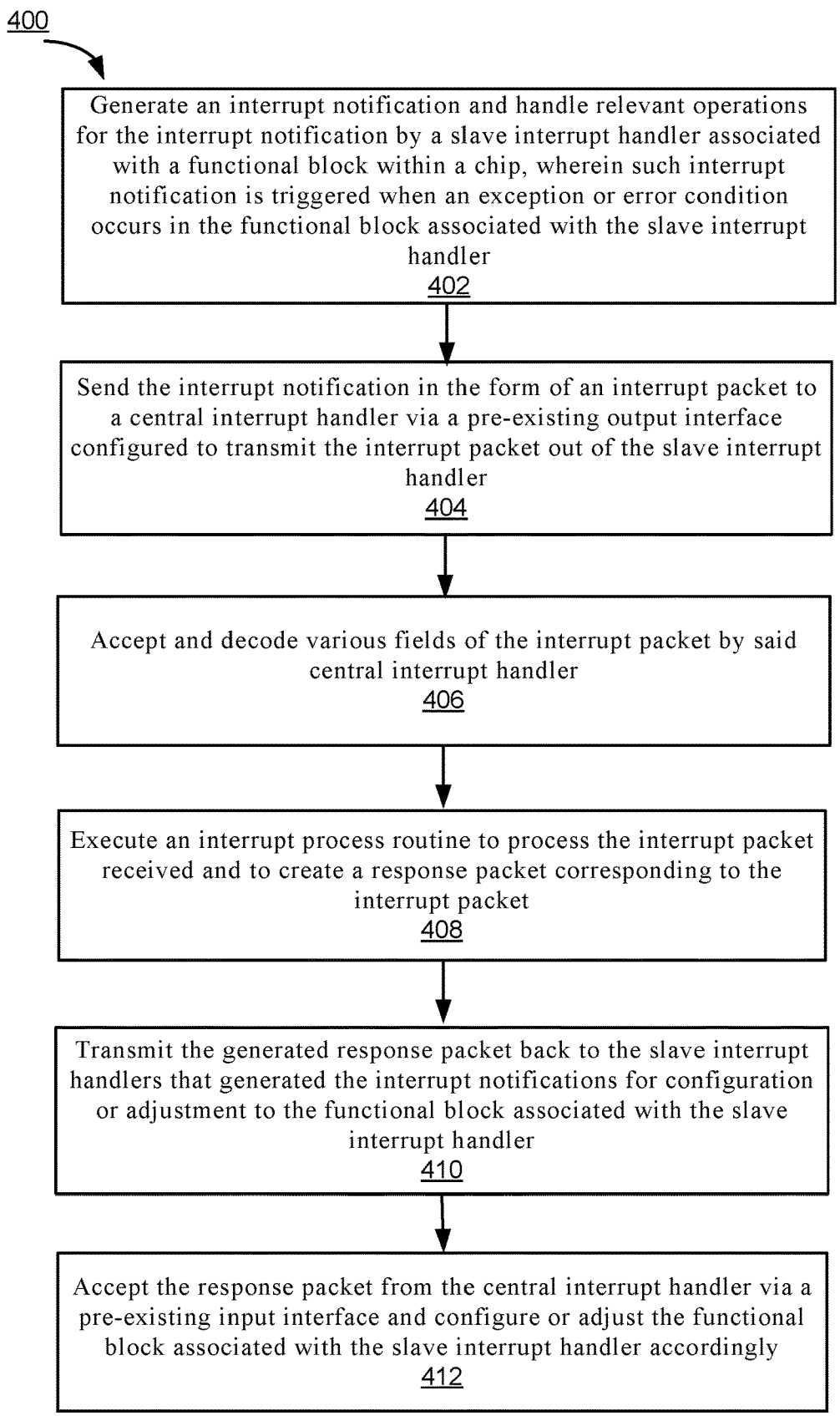
FIG. 4 depicts a flowchart of an example of a process to support hardware-based hierarchical interrupt propagation for efficient interrupt propagation and handling according to an aspect of a present embodiment.

FIG. 4 depicts a flowchart 400 of an example of a process to support hardware-based hierarchical interrupt propagation for efficient interrupt propagation and handling. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 4, the flowchart 400 starts at block 402, where an interrupt notification is generated and relevant operations for the interrupt notification are handled by a slave interrupt handler associated with a functional block within a chip, wherein such interrupt notification is triggered when an exception or error condition occurs in the functional block associated with the slave interrupt handler. The flowchart 400 continues to block 404, where the interrupt notification is sent in the form of an interrupt packet to a central interrupt handler via a pre-existing output interface configured to transmit the interrupt packet out of the slave interrupt handler. The flowchart 400 continues to block 406, where a plurality of fields of the interrupt packet are accepted and decoded by the central interrupt handler. The flowchart 400 continues to block 408, where an interrupt process routine is executed by the central interrupt handler to process the interrupt packet received and to create a response packet in response to the interrupt packet. The flowchart 400 continues to block 410, where the generated response packet is transmitted back to the slave interrupt handlers that generated the interrupt notification for configuration or adjustment to the functional block associated with the slave interrupt handler. The flowchart 400 ends at block 412, where the response packet from the central interrupt handler is accepted via a pre-existing input interface and the functional block associated with the slave interrupt handler is configured or adjusted accordingly.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based programmable hierarchical interrupt propagation architecture, comprising:
   a plurality of slave interrupt handlers each associated with a functional block within a chip, wherein each slave interrupt handler of the plurality of slave interrupt handlers communicates using at least one pre-existing input interface and one pre-existing output interface, wherein a register within the functional block is accessed via the at least one pre-existing input interface and the one pre-existing output interface, wherein each of the plurality of slave interrupt handlers is configured to
   generate an interrupt notification for the interrupt notification, wherein such interrupt notification is triggered when an exception or error condition occurs in the functional block associated with the slave interrupt handler;

send the interrupt notification in the form of an interrupt packet to a central interrupt handler via the pre-existing output interface configured to transmit the interrupt packet out of the slave interrupt handler;

accept a response packet from the central interrupt handler via the pre-existing input interface and configure or adjust the functional block associated with the slave interrupt handler accordingly.

2. The architecture of claim 1, further comprising:
said central interrupt handler configured to
accept and decode various fields of the interrupt packet;
execute an interrupt process routine to process the interrupt packet received and to create said response packet corresponding to the interrupt packet;
transmit the generated response packet back to the slave interrupt handlers that generated the interrupt notifications for configuration or adjustment to the functional block associated with the slave interrupt handler.

3. The architecture of claim 2, wherein:
the pre-existing input interface and the pre-existing output interface of the each slave interrupt of the plurality of slave interrupt handlers are register access interfaces that have already been utilized to access the register module in the functional block to write data and/or control information into or read data and/or control information from certain addresses of the register module, respectively.

4. The architecture of claim 2, wherein:
the central interrupt handler includes a plurality of interrupt registers corresponding to a set of interrupt priorities according to a priority field of the interrupt packet, wherein the plurality of interrupt registers each has as many bits as the number of functional blocks in the chip.

5. The architecture of claim 4, wherein:
the central interrupt handler is configured to utilize the plurality of interrupt registers to combine interrupt notifications received from a plurality of functional blocks across the chip for processing.

6. The architecture of claim 5, wherein:
the central interrupt handler is configured to select one interrupt register of the plurality of interrupt registers to be accessed and set for the interrupt notification based on the priority field of the interrupt packet.

7. The architecture of claim 6, wherein:
the central interrupt handler is configured to
utilize a combination of the block type and block instance fields for indexing the received interrupt notification to select a corresponding interrupt bit in the interrupt register selected based on the priority field;
set or clear value of the interrupt bit in the interrupt register selected.

8. The architecture of claim 4, wherein:
the central interrupt handler is configured to execute an interrupt process routine to process the interrupt packet received based on its priority or the order the interrupt packet is received in the interrupt registers to create said response packet corresponding to the interrupt packet.

9. The architecture of claim 1, wherein:
each slave interrupt handler of the plurality of slave interrupt handlers is a register module configured to implement a set of register functionalities associated with the functional block associated with the each slave interrupt handler in the chip.

10. The architecture of claim 1, further comprising:
a plurality of address decoders arranged in a multi-level hierarchy, wherein each address decoder of the plurality of address decoders is associated with one or more of the plurality of slave interrupt handlers and/or one or more other address decoders of the plurality of address decoders, wherein the each address decoder of the plurality of address decoders is configured to
accept the interrupt packet from the associated one or more of the plurality of slave interrupt handlers and/or the one or more other address decoders;
decode destination address of the interrupt packet;
forward the interrupt packet to the central interrupt handler or the next address decoder in the multi-level hierarchy.

11. The architecture of claim 10, wherein:
the each address decoder of the plurality of address decoders is further configured to
accept the response packet from the central interrupt handler,
decode destination address of the response packet,
forward the response packet to the slave interrupt handler or the next address decoder which sent the corresponding interrupt packet, in the multi-level hierarchy.

12. The architecture of claim 1, wherein:
each slave interrupt handler of the plurality of slave interrupt handlers is configured to generate the interrupt notification upon setting an interrupt bit in a special interrupt register of the slave interrupt handler.

13. The architecture of claim 12, wherein:
the interrupt packet includes one or more of the interrupt bit, a priority field indicating priority of the interrupt notification, a block type field that uniquely identifies a types of the functional block where the interrupt notification is generated, and a block instance field that uniquely identifies an instance of the type of the functional block where the interrupt notification is generated.

14. The architecture of claim 1, wherein the response packet is received by a decoder that determines the functional block to received the response packet, and wherein the response packet is sent to the functional block via the pre-existing input interface.

15. A method to support hierarchical interrupt propagation scheme for efficient interrupt propagation and handling, comprising:
generating an interrupt notification for the interrupt notification by a slave interrupt handler associated with a functional block within a chip, each slave interrupt handler of the plurality of slave interrupt handlers communicates using at least one pre-existing input interface and one pre-existing output interface, wherein a register within the functional block is accessed via the at least one pre-existing input interface and the one pre-existing output interface;
wherein such interrupt notification is triggered when an exception or error condition occurs in the functional block associated with the slave interrupt handler;
sending the interrupt notification in the form of an interrupt packet to a central interrupt handler via a pre-existing output interface configured to transmit the interrupt packet out of the slave interrupt handler;

accepting the response packet from the central interrupt handler via a pre-existing input interface and configuring or adjusting the functional block associated with the slave interrupt handler.

16. The method of claim 15, further comprising:
accepting and decoding various fields of the interrupt packet by said central interrupt handler;
executing an interrupt process routine to process the interrupt packet received and to create a response packet corresponding to the interrupt packet;
transmitting the generated response packet back to the slave interrupt handlers that generated the interrupt notifications for configuration or adjustment to the functional block associated with the slave interrupt handler.

17. The method of claim 16, further comprising:
implementing in the central interrupt handler a plurality of interrupt registers corresponding to a set of interrupt priorities according to a priority field of the interrupt packet, wherein the plurality of interrupt registers each has as many bits as the number of functional blocks in the chip.

18. The method of claim 17, further comprising:
utilizing the plurality of interrupt registers to combine interrupt notifications received from a plurality of functional blocks across the chip for processing.

19. The method of claim 18, further comprising:
selecting which one interrupt register of the plurality of interrupt registers to be accessed and set for the interrupt notification based on the priority field of the interrupt packet.

20. The method of claim 19, further comprising:
utilizing a combination of the block type and block instance fields for indexing the received interrupt notification to select a corresponding interrupt bit in the interrupt register selected based on the priority field;
setting or clearing value of the interrupt bit in the interrupt register selected.

21. The method of claim 17, further comprising:
executing the interrupt process routine to process the interrupt packet received based on its priority or the order the interrupt packet is received in the interrupt registers to create said response packet corresponding to the interrupt packet.

22. The method of claim 15, further comprising:
accepting the interrupt packet from the associated one or more of the plurality of slave interrupt handlers and/or one or more address decoders;
decoding destination address of the interrupt packet;
forwarding the interrupt packet to the central interrupt handler or the next address decoder in the multi-level hierarchy.

23. The method of claim 22, further comprising:
accepting the response packet from the central interrupt handler,
decoding destination address of the response packet,
forwarding the response packet to the slave interrupt handler or the next address decoder which sent the corresponding interrupt packet, in the multi-level hierarchy.

24. The method of claim 15, further comprising:
generating the interrupt notification upon setting an interrupt bit in a special interrupt register of the slave interrupt handler.

25. The method of claim 24, wherein:
the interrupt packet includes one or more of the interrupt bit, a priority field indicating priority of the interrupt notification, a block type field that uniquely identifies a types of the functional block where the interrupt notification is generated, and a block instance field that uniquely identifies an instance of the type of the functional block where the interrupt notification is generated.

* * * * *